United States Patent
Kozulla et al.

(10) Patent No.: US 6,451,425 B1
(45) Date of Patent: Sep. 17, 2002

(54) ADHESIVE TAPE BACKING

(75) Inventors: Randall E. Kozulla, Stillwater, MN (US); Joseph T. Bartusiak, Osseo, MN (US); Patrick J. Hager, Woodbury, MN (US); Scott D. Pearson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/333,670

(22) Filed: Jun. 16, 1999

(51) Int. Cl.[7] ............................................. B32B 27/36
(52) U.S. Cl. .............................. 428/355 EN; 428/343; 428/910
(58) Field of Search .......................... 428/355 EN, 343, 428/40.1, 910

(56) References Cited

U.S. PATENT DOCUMENTS

| | | |
|---|---|---|
| 3,241,662 A | 3/1966 | Robinson et al. .............. 206/59 |
| 3,324,218 A | 6/1967 | Gebler et al. ................ 264/210 |
| 3,372,049 A | 3/1968 | Schaffhausen |
| 3,491,877 A | 1/1970 | Viker et al. .................... 206/59 |
| 3,853,598 A | 12/1974 | Raguse ......................... 117/76 |

(List continued on next page.)

FOREIGN PATENT DOCUMENTS

| | | |
|---|---|---|
| EP | 02555866 | 2/1988 |
| EP | 0 459 059 A2 | 12/1991 |
| EP | 650 818 | 12/1997 |

OTHER PUBLICATIONS

DATABASE/WPI Section Ch. Week 9329, Derwent Publications Ltd., London, GB; Class A17, AN 93–231949 XP002107479 & JP 05 154905 A (Toray Ind Inc.) Jun. 22, 1993.

Morphology and phase behaviour of blends of syndiotactic and isotactic polypropylene: 1. X–ray scattering, light microscopy, atomic force microscopy, and scanning electron microscopy, Ralf Thomann, Jörg Kressler, Stefan Setz, Chun Wang and Rolf Mülhaupt, Polymer vol. 37, No. 13, 1996, pp. 2627–2634.

Potential Film Applications for Syndiotactic Polypropylene, J. Schardl and L. Sun, S. Kimura and R. Sugimoto, Journal of Plastic Film & Sheeting, vol. 12—Apr. 1996, pp. 157–165.

DATABASE WPI, Section Ch, Week 197544, Derwent Publications Ltd., London, GB; Class A17, AN 1975–73055W XP002129705 & JP 50 037843 A (Toyobo KK), Apr. 8, 1975 abstract.

*Primary Examiner*—Robert Dawson
*Assistant Examiner*—Christopher M Keehan
(74) *Attorney, Agent, or Firm*—James J. Trussell; Carolyn V. Peters (57) ABSTRACT

Adhesive tape backings comprising isotactic polypropylene blended or mixed with at least a second polyolefin. The backing is biaxially stretched so as to provide a film having any one or a combination of the following preferred characteristics:

A. Puncture energy up to 20 $J/cm^2$ when 2.54 cm wide samples are tested by the method set herein, or up to 90 $J/cm^2$ when 1.27 cm wide samples are tested by the method set out herein.

B. Puncture elongation up to about 1.3 cm when 2.54 cm wide samples are tested by the method set out herein, or up to 2.0 cm when 1.27 cm wide samples are tested by the method set out herein.

C. Tensile strength up to 140 MPa in the MD.

In a preferred embodiment, the second component comprises polyethylene, polybutylene, or syndiotactic polypropylene.

11 Claims, 2 Drawing Sheets

U.S. PATENT DOCUMENTS

| | | | |
|---|---|---|---|
| 3,887,745 A | 6/1975 | Yoshii et al. | 428/213 |
| 4,045,515 A | 8/1977 | Isaka et al. | 260/897 |
| 4,137,362 A | 1/1979 | Miki et al. | 428/337 |
| 4,139,669 A | 2/1979 | Chang | 428/167 |
| 4,173,676 A | 11/1979 | Asakura et al. | 428/332 |
| 4,230,767 A | 10/1980 | Isaka et al. | 428/349 |
| 4,330,499 A | 5/1982 | von un zu Aufsess et al. | 264/289 |
| 4,393,115 A | 7/1983 | Yoshii et al. | 428/323 |
| 4,414,261 A | 11/1983 | Nanbu | 428/213 |
| 4,447,485 A | 5/1984 | Aritake | 428/144 |
| 4,451,533 A | 5/1984 | Wong et al. | 428/337 |
| 4,513,028 A | 4/1985 | Aritake | 427/173 |
| 4,536,441 A | 8/1985 | Schmeer et al. | 428/347 |
| 4,581,087 A | 4/1986 | Johnson | 156/209 |
| 4,595,738 A | 6/1986 | Hufnagel et al. | 526/348.1 |
| 4,675,582 A | 6/1987 | Hommes et al. | 318/38 |
| 4,825,111 A | 4/1989 | Hommes et al. | 310/12 |
| 4,853,602 A | 8/1989 | Hommes et al. | 318/38 |
| 4,908,278 A | 3/1990 | Bland et al. | 428/500 |
| 5,036,262 A | 7/1991 | Schonbach | 318/38 |
| 5,051,225 A | 9/1991 | Hommes et al. | 264/288.4 |
| 5,072,493 A | 12/1991 | Hommes et al. | 26/72 |
| 5,073,458 A | 12/1991 | Hwo et al. | 428/516 |
| 5,077,121 A | 12/1991 | Harrison et al. | 428/213 |
| 5,118,566 A | 6/1992 | Wilhelm et al. | 428/339 |
| 5,252,389 A | 10/1993 | Schmidt et al. | 428/334 |
| 5,292,561 A | 3/1994 | Peiffer et al. | 428/35.1 |
| 5,366,796 A | 11/1994 | Murschall et al. | 428/216 |
| 5,374,482 A | 12/1994 | Ozari et al. | 428/343 |
| 5,620,803 A | 4/1997 | Oyama et al. | 428/516 |
| 5,691,043 A | 11/1997 | Keller et al. | 428/212 |
| 5,795,834 A | 8/1998 | Deeb et al. | 442/62 |

ADHESIVE TAPE BACKING

TECHNICAL FIELD

The present invention generally relates to films useful as tape backings, and more particularly to biaxially oriented backings comprising a blend of isotactic polypropylene with at least a second polyolefin.

BACKGROUND OF THE INVENTION

Commercially available pressure sensitive adhesive tapes are usually provided in a roll form and can be provided on a tape dispenser (see e.g. U.S. Pat. Nos. 4,451,533 and 4,908,278). In the case where no dispenser is provided, it is desirable that the tape can be torn by hand.

Commercially available tape dispensers typically have either a metal or plastic serrated cutting blade. "Severability" of adhesive tape is defined as the ability to cut or sever a length of tape by pulling the tape over the teeth on the serrated cutting edge of a tape dispenser with a desired amount of energy or work. Severability is also referred to as "dispensability." It is desired that the severed tape does not chip, sliver, fracture or break in an unpredictable manner (see U.S. Pat. Nos. 4,451,533 and 4,908,278). Such severability is desirable to produce a cleanly serrated cut edge on the severed tape strip.

Commercially available biaxially oriented isotactic polypropylene films are well known for their toughness, low cost, good color, moisture and slivering resistance, and clarity and have long been used as adhesive tape backings (see U.S. Pat. Nos. 3,241,662 and 3,324,218). However, adhesive tapes produced from such films tend to be too tough and stretch significantly before breaking while under load, and this renders such films extremely difficult to sever, particularly on a plastic bladed dispenser.

Commercially available tape dispensers with plastic cutting blades are commonly used for hand-held units such as a Catalog No. 104 3M Magic™ tape dispenser, available from Minnesota Mining and Manufacturing Company, St. Paul, Minn. However, dispensers with plastic cutting blades are typically not sharp and durable enough to sever oriented polypropylene tapes acceptably. For this reason, commercially available dispensers for biaxially oriented polypropylene tape usually are equipped with sharp metal blades. Such metal blade dispensers are more costly and difficult to manufacture than dispensers with plastic blades.

Several attempts at providing desirable biaxially oriented polypropylene films are known from the art. See, for example, U.S. Pat. Nos. 4,414,261, 4,451,533; 5,252,389; 5,118,566 and 5,366,796. Several attempts at providing tape backings that may be torn by hand (typically in the transverse direction of the backing) are known from the art. See for example, U.S. Pat. Nos. 3,491,877; 3,853,598; 3,887,745; 4,045,515; 4,139,669; 4,173,676; 4,393,115; 4,414,261; 4,447,485; 4,513,028; 4,563,441; 4,581,087; 5,374,482; and 5,795,834.

In addition, there have been attempts to provide oriented polymer films comprising polypropylene blended or laminated with at least one other polymer to produce packaging tapes and films. It has been known to provide a packaging adhesive tape based on polypropylene stretched film containing a soft or rubbery polymer such as polyethylene, polyisobutylene, or ethylene propylenediene and stretched primarily transversely to the machine direction. U.S. Pat. No. 4,137,362 discloses an example of a packaging adhesive tape. It has also been known to provide packaging films comprising oriented polypropylene blended or laminated with at least one other polymer and stretched to provide significant heat shrinkage in the longitudinal direction, and also to provide toughness, tear resistance, puncture resistance, or heat sealability. See for example U.S. Pat. Nos. 4,230,767; 5,691,043; 5,292,561; 5,073,458; 5,077,121; and 5,620,803.

SUMMARY OF THE INVENTION

It is desired that severable adhesive polyolefin based tapes display a combination of characteristics, particularly low puncture resistance, low tear resistance, low elongation to puncture failure and low tensile strength in the longitudinal tape direction. It has been surprisingly found that biaxially oriented adhesive tape backing comprising isotactic polypropylene combined with at least one other polyolefin can be biaxially stretched so as to provide the desirable properties described herein.

Certain terms are used in the description and the claims that, while for the most part are well known, may require some explanation. "Biaxially stretched," when used herein to describe a film, indicates that the film has been stretched in two different directions, a first direction and a second direction, in the plane of the film. Typically, but not always, the two directions are substantially perpendicular and are in the longitudinal or machine direction ("MD") of the film (the direction in which the film is produced on a film-making machine) and the transverse direction ("TD") of the film (the direction perpendicular to the MD of the film). The MD is sometimes referred to as the Longitudinal Direction ("LD"). Biaxially stretched films may be sequentially stretched, simultaneously stretched, or stretched by some combination of simultaneous and sequential stretching. "Simultaneously biaxially stretched," when used herein to describe a film, indicates that significant portions of the stretching in each of the two directions are performed simultaneously. Unless context requires otherwise, the terms "orient," "draw," and "stretch" are used interchangeably throughout, as are the terms "oriented," "drawn," and "stretched," and the terms "orienting," "drawing," and "stretching."

The term "stretch ratio," as used herein to describe a method of stretching or a stretched film, indicates the ratio of a linear dimension of a given portion of a stretched film to the linear dimension of the same portion prior to stretching. For example, in a stretched film having an MD stretch ratio ("MDR") of 5:1, a given portion of unstretched film having a 1 cm linear measurement in the machine direction would have 5 cm measurement in the machine direction after stretch. In a stretched film having a TD stretch ratio ("TDR") of 9:1, a given portion of unstretched film having a 1 cm linear measurement in the transverse direction would have 9 cm measurement in the transverse direction after stretch.

"Area stretch ratio," as used herein, indicates the ratio of the area of a given portion of a stretched film to the area of the same portion prior to stretching. For example, in a biaxially stretched film having an overall area stretch ratio of 50:1, a given 1 cm$^2$ portion of unstretched film would have an area of 50 cm$^2$ after stretching.

The present invention provides a film suitable for use as an adhesive tape backing. The backing comprises isotactic polypropylene blended or mixed with at least a second polyolefin. The backing is biaxially stretched so as to provide a film having the following preferred characteristics:

A. Puncture energy up to 20 J/cm$^2$ when 2.54 cm wide samples are tested by the method set out below, or up to 90 J/cm² when 1.27 cm wide samples are tested by the method set out below.

B. Puncture elongation up to about 1.3 cm when 2.54 cm wide samples are tested by the method set out below, or up to 2.0 cm when 1.27 cm wide samples are tested by the method set out below.

C. Tensile strength up to 140 MPa in the MD.

In one preferred embodiment, the tape backing meets characteristics A, B, and C above. In another preferred embodiment, the tape backing meets condition A. In another preferred embodiment, the tape backing meets conditions A and B above. In yet another preferred embodiment, the tape backing meets conditions B and C above.

In one preferred embodiment, the puncture energy is up to 8 J/cm², and in another embodiment up to 5 J/cm², both with regard to testing 2.54 cm wide samples.

In another preferred embodiment, the tensile strength is up to 100 MPa, and in another preferred embodiment, up to 50 MPa.

In another preferred embodiment, the second component comprises polyethylene, polybutylene, or syndiotactic polypropylene.

In another preferred embodiment, the backing comprises 20% to 40% of said second component.

In another preferred embodiment, the backing comprises a monolayer.

In another preferred embodiment, the isotactic polypropylene has a first melting point, and the second component has a second melting point lower than the first melting point and above 100° C. More preferably, the second melting point is between about 120° C. and 155° C.

In another preferred embodiment, the backing has an area stretch ratio of at least 36:1.

In another preferred embodiment, the backing has an MDR of at least 4:1.

In another preferred embodiment, when the backing is severed on a serrated plastic cutting blade, the backing exhibits a serrated edge that closely follows the contour of the cutting blade.

In another preferred embodiment, the backing has been simultaneously biaxially stretched.

Tape backings of the present invention may be hand tearable. It has been found that when the backing has a puncture energy of up to 8 J/cm² (as tested on a 2.54 cm wide sample) and a tensile strength of up to 100 MPa, the tape backing is moderately easy to tear by hand. When the backing has a puncture energy of up to 5 J/cm² (as tested on a 2.54 cm wide sample) and a tensile strength of up to 50 MPa, the tape backing is easy to tear by hand.

The present invention provides films described above, tape backings made from such films, tapes including the backings, and methods of making the films, backings, and tapes.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

Figure 1:
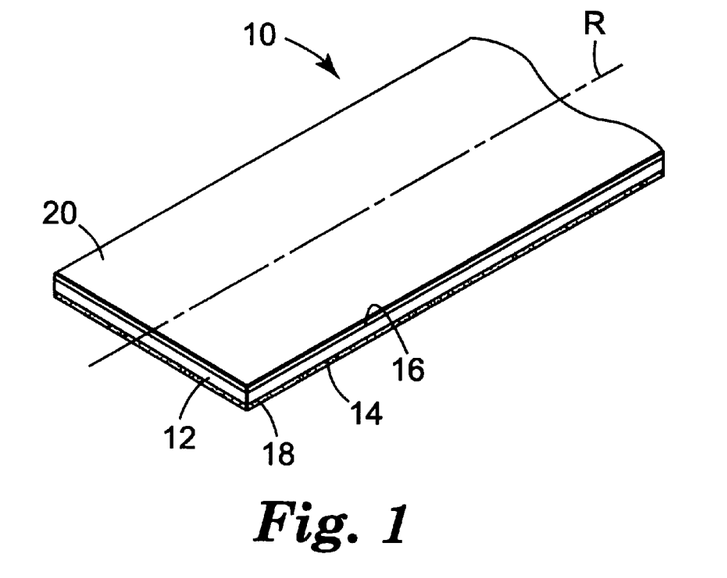
FIG. 1 is an isometric view of a length of tape according to the present invention.

Referring to FIG. 1, there is shown a length of tape 10 according to one preferred embodiment of the present invention. Tape 10 comprises a biaxially oriented film backing 12 which includes first major surface 14 and second major surface 16. Preferably, backing 12 has a thickness in the range of about 0.002 to about 0.006 centimeters. Backing 12 of tape 10 is coated on first major surface 14 with a layer of adhesive 18. Adhesive 18 may be any suitable adhesive as is known in the art. Backing 12 may have an optional release or low adhesion backsize layer 20 coated on the second major surface 16 as is known in the art.

The backing film 12 preferably comprises isotactic polypropylene blended or mixed with at least a second component comprising a polyolefin. The blend contains between about 90% to 40%, preferably between about 80% and 60% of the isotactic polypropylene, and from 10% to 60%, more preferably about 20% to 40% of the second component. All percentages of components stated herein, including the claims, are stated in percent by weight, unless specified otherwise or unless the context requires otherwise. The second polyolefin preferably has a melting point lower than the melting point of the isotactic polypropylene (typically about 165° C.), but above about 100° C. If the melting point of the second component is greater than that of the isotactic polypropylene, the composition is difficult to biaxially orient to a high stretch ratio. If the melting point of the second component is below about 100° C., the stretched film is difficult to process due to sag and melting during stretching, and is considered too soft for use as an adhesive tape substrate. It is preferred that the second component have a melting point between about 120° C. and 155° C. Polyolefins suitable for use as the second component may be chosen from those olefinic polymers exhibiting Differential Scanning Calorimetry (DSC) crystalline melting points between about 100° and 155° C., preferably between about 120° C. and about 155° C. Desirable polyolefin polymers include low density polyethylene; linear low density polyethylene; high density polyethylene; atactic polypropylene; syndiotactic polypropylene; reduced crystallinity polypropylene; maleated polypropylene; poly-1-butylene, known as polybutylene; copolymers of ethylene, propylene and/or 1-butylene; ethylene vinyl copolymers like ethylene-co-vinyl acetate and ethylene acrylic or methacrylic acid copolymers. Particularly preferred polyolefin polymers include low or high density polyethylene, linear low density polyethylene, syndiotactic polypropylene, and poly-1-butylenes.

The isotactic polypropylene component of the backing may comprise a single isotactic polypropylene, or a blend or mix of two or more isotactic polypropylenes. Likewise, the second component comprising a polyolefin may comprise a single polyolefin or a mix or blend of two or more polyolefins.

For the purposes of the present invention, the term "polypropylene" is meant to include copolymers comprising at least about 90% propylene monomer units, by weight. The polypropylene for use as the first component in the present invention is predominantly isotactic. Isotactic polypropylene has a chain isotacticity index of at least about 80%, an n-heptane soluble content of less than about 15% by weight, and a density between about 0.86 and 0.92 grams/cm³ measured according to ASTM D1505-96 ("Density of Plastics by the Density-Gradient Technique"). Typical polypropylenes for use in the present invention have a melt flow index between about 0.1 and 25 grams/10 minutes according to ASTM D1238-95 ("Flow Rates of Thermoplastics by Extrusion Plastometer") at a temperature of 230° C. and force of 2160 g, a weight-average molecular weight between about 100,000 and 700,000 g/mole, and a polydispersity index between about 2 and 15. Typical polypropylenes for use in the present invention have a peak melting temperature as determined using differential scanning calorimetry of greater than about 140° C., preferably greater than about 150° C., and most preferably greater than about 160° C. Further, the polypropylenes useful in this invention may be copolymers, terpolymers, etc., having ethylene monomer units and/or alpha-olefin monomer units of between 4–8 carbon atoms, said comonomer(s) being present in an amount so as not to adversely affect the desired properties and characteristics of the backing and tapes described herein, typically their content being less than 10% by weight. One suitable polypropylene resin is an isotactic polypropylene homopolymer resin having a melt flow index of 2.5 g/10 minutes, commercially available under the product designation 3374 from FINA Oil and Chemical Co., Dallas, Tex. Another suitable polypropylene resin is an isotactic polypropylene homopolymer resin having a melt flow index of 9.0 g/10 minutes, commercially available under the product designation 3571, also from FINA Oil and Chemical Co., Dallas, Tex. The polypropylene resins are not restricted in terms of melt flow properties, as the proper melt flow resin may be chosen suitable for a particular polymer blend process.

Polypropylene for use in the present invention may optionally include, in an amount so as not to adversely affect the desired characteristics and properties described herein, a resin of synthetic or natural origin having a molecular weight between about 300 and 8000 g/mole, and having a softening point between about 60° C. and 180° C. Typically, such a resin is chosen from one of four main classes: petroleum resins, styrene resins, cyclopentadiene resins, and terpene resins. Optionally, resins from any of these classes may be partially or fully hydrogenated. Petroleum resins typically have, as monomeric constituents, styrene, methylstyrene, vinyltoluene, indene, methylindene, butadiene, isoprene, piperylene, and/or pentylene. Styrene resins typically have, as monomeric constituents, styrene, methylstyrene, vinyltoluene, and/or butadiene. Cyclopentadiene resins typically have, as monomeric constituents, cyclopentadiene and optionally other monomers. Terpene resins typically have, as monomeric constitutents, pinene, alpha-pinene, dipentene, limonene, myrcene, and camphene.

Polypropylene for use in the present invention may optionally include additives and other components as is known in the art. For example, the films of the present invention may contain fillers, pigments and other colorants, antiblocking agents, lubricants, plasticizers, processing aids, antistatic agents, antioxidants and heat stabilizing agents, ultraviolet-light stabilizing agents, and other property modifiers. Fillers and other additives are preferably added in an effective amount selected so as not to substantially affect the nucleation of the cast film and so as not to adversely affect the properties attained by the preferred embodiments described herein. Typically such materials are added to a polymer before it is made into an oriented film (e.g., in the polymer melt before extrusion into a film).

The isotactic polypropylene and second polyolefin blend can be cast into sheet form by apparatus known to those of skill in the art. Such cast films are then stretched to arrive at the preferred film described herein. When making films according to the present invention, a suitable method for casting a sheet is to feed the resins into the feed hopper of a single screw, twin screw, cascade, or other extruder system having an extruder barrel temperature adjusted to produce a stable homogeneous melt. The melt can be extruded through a sheet die onto a rotating cooled metal casting wheel. Optionally, the casting wheel can be partially immersed in a fluid-filled cooling bath, or, also optionally, the cast sheet can be passed through a fluid-filled cooling bath after removal from the casting wheel. The temperatures of this operation can be chosen by those of skill in the art with the benefit of the teachings herein to provide the desired nucleation density, size, and growth rate such that the resulting stretched film has the desired characteristics and properties described herein. Typical casting wheel temperatures, as well as water bath temperatures, are below about 60° C., preferably below about 40° C., to provide a suitably crystallized sheet.

The sheet is then biaxially stretched to provide backing 12 having the desired characteristics and properties described herein.

The preferred properties described herein may be obtained by any suitable apparatus for biaxially orienting the backing 12 according to the preferred methods described herein. Of all stretching methods, the apparatus preferred for commercial manufacture of films for tape backings include: sequential biaxial stretching apparatus that typically stretches in the MD first by passing the film over a sequence of rotating rollers whose speed provides a higher output film line speed than input speed, followed by TD stretching in a tenter on diverging rails; simultaneous biaxial stretching by mechanical tenter such as the apparatus disclosed in U.S. Pat. Nos. 4,330,499 and 4,595,738; and the tenter apparatus for simultaneous biaxial stretch disclosed in U.S. Pat. Nos. 4,675,582; 4,825,111; 4,853,602; 5,036,262; 5,051,225; and 5,072,493. Although biaxially stretched films can be made by tubular blown film or bubble film making processes, it is preferable that the films of this invention, when used as tape backings, be made by a flat film stretching apparatus to avoid processing difficulties such as non-uniform thickness and stretching, and inadequate temperature control that may arise with tubular blown film processes.

In one preferred embodiment, the biaxial area stretch ratio is above about 36:1, more preferably from about 36:1 to 90:1, still more preferably about 45:1 to 90:1, and most preferably from about 55:1 to 90:1. The upper limit for area stretch ratio is the practical limit at which the film can no longer be stretched on commercial available apparatus at sufficiently high speeds. Preferably, the MD stretch ratio is above about 4:1, more preferably from about 4:1 to 8.5:1, still more preferably from about 5:1 to 8:5:1, and most preferably from about 6.0:1 to 8.5:1. The MD component and TD component of these embodiments is chosen so as to provide the desired film properties and characteristics described herein. If the orientation of the films of this invention are below the stated ranges, the film tends to be understretched, that is, exhibit elongation to puncture values greater than 1.3 cm, which leads to excessive elongation during severing or hand tearing leading to distorted severed edges and stress whitening. In addition, inadequate stretching leads to localized necking and non-uniformity of thickness and physical properties across the sheet, both of which are highly undesirable from the standpoint of adhesive tape manufacturing.

In one preferred embodiment, the machine direction stretch ratio is at about the same as or greater than the transverse direction stretch ratio, to provide adhesive tape backing film with low puncture resistance and limited elongation to break in the machine direction. Such tapes avoid stretching and distortion during severing on the teeth of commercially available tape dispensers to produce cleanly serrated edges.

The temperatures of the stretching operation can be chosen by those of skill in the art with the benefit of the teachings herein to provide a film having the desired characteristics and properties described herein. These temperatures will vary with the material used, and with the heat transfer characteristics of the particular apparatus used. For one preferred sequential stretch apparatus, it is preferred that the preheat roll and the stretch roll for the MD stretch be maintained at about 120–135° C. It is also preferred that for the TD stretch in the tenter, the preheat zone be maintained at about 180–190° C., and the stretch zone be maintained at about 160–180° C. For simultaneously stretched backings, it is preferred that the preheat and stretch be from approximately 160° C. to 215° C.

The backing 12 useful in this invention, when used as a backing for a tape 10, preferably has a final thickness between about 0.002–0.006 cm. Variability in film thickness is preferably less than about 5%. Thicker and thinner films may be used, with the understanding that the film should be thick enough to avoid excessive flimsiness and difficulty in handling, while not being so thick so as to be undesirably rigid or stiff and difficult to handle or use.

The polypropylene blend composition, extrusion temperature, cast roll temperature, and stretch temperature and other parameters are selected in accordance with the teachings herein such that the resulting backing or tape has the following preferred properties, taken individually or in any preferred combination:

A. Puncture energy up to 20 $J/cm^2$ when 2.54 cm wide samples are tested by the method set out below, or up to 90 $J/cm^2$ when 1.27 cm wide samples are tested by the method set out below.

B. Puncture elongation up to about 1.3 cm when 2.54 cm wide samples are tested by the method set out below, or up to 2.0 cm when 1.27 cm wide samples are tested by the method set out below.

C. Tensile strength up to 140 MPa in the MD.

With respect to factors A and B, the preferred values are described with respect to the particular sample size used to test the tape backing film, and not with respect to the tape backing itself if it happens to be of a different width. In other words, the invention is not limited to 2.54 cm wide backings, or to 1.27 cm wide backings. Rather, condition A or B is considered to be met for any given tape backing of any width, provided that a sample taken of either 2.54 cm width or 1.27 cm width, of the given tape backing of any width, meets the specified values when testing according to the methods described below.

These characteristics are preferred for the following reasons. It has been observed that if the puncture energy is too high, the tape cannot be readily severed. It has been observed that if the puncture elongation is too high, the tape can become distorted during severing, become difficult to tear by hand, or show significant stress whitening when torn or dispensed. As to the tensile strength, it is desirable to provide a tape backing without an undesirably high tensile strength. If the tensile strength in the tape direction is too high, the tape becomes too strong to easily sever or tear by hand, and may cause excessive tooth wear on a serrated dispenser. As to the lower limits of these values, these are as a practical matter determined by handling, converting, and use requirements. For example, if the tensile strength is too low, the tape backing would be prone to breakage during processing, coating, converting, or slitting. In many cases, it is preferred that the tape backing have a tensile strength of at least 15 MPa. As to the puncture energy and puncture elongation, if these are too low, the tape may be too weak for many intended applications. In many cases, it is preferred that the tape backing have an elongation energy of at least 0.4 $J/cm^2$ for a 2.54 cm wide sample, or 6.0 $J/cm^2$ for a 1.27 cm wide sample.

One preferred embodiment of the present invention comprises a monolayer backing. As used herein, the term monolayer includes multiple layers of substantially the same material or substantially the same blends of materials.

In one preferred embodiment the biaxially stretched adhesive tape backing can be torn by hand. More preferably the backing or tape has a puncture energy of up to about 8 $J/cm^2$ (with respect to testing a 2.54 cm wide sample) and a tensile strength of up to about 100 MPa and can be torn by hand. Most preferably the backing or tape has a puncture energy of up to about 5 $J/cm^2$ (with respect to testing a 2.54 cm wide sample) and a tensile strength of up to about 50 MPa and can be torn by hand.

The above properties and characteristics are described herein with respect to the preferred embodiments, and reported herein with respect to the examples, for a film or backing 12 without adhesive 18 thereon. It is expected that in most cases, the characteristics and properties are governed primarily by the backing, with little affect by the adhesive or other layers or coatings. Therefore, the above preferred characteristics and properties also apply to the adhesive tapes of the present invention.

Mechanically, severability can be considered as the loading to break of the tape backing as it is pulled over the teeth of a commercial adhesive tape dispenser. Similarly, the ability to tear an adhesive tape by hand can be considered as the loading to break of the backing as it is pulled between the fingers. In either case, both the energy to cause break and the elongation to break can be used to evaluate the suitability of a particular tape backing for use. The resistance to break can be evaluated in a tensile test or by means of a puncture test, in which the tape backing is held fixed in a clamp and a test probe is driven through the tape backing until the tape breaks. It is desirable to obtain a biaxially oriented polypropylene based tape or tape backing which has sufficiently low tensile strength and low puncture resistance so as to be severable and tearable by hand.

For oriented polymer films like those comprising biaxially oriented polypropylene, the primary physical properties which relate to severability or tearability are the crystallinity, polymer molecular weight and composition, overall orientation and directionality of the orientation. These physical properties in turn govern the film mechanical properties such as strength, toughness, tensile elongation to break and puncture resistance. It is desired that severable and hand tearable adhesive tapes display a combination of characteristics, particularly low puncture resistance, low tear resistance, low elongation to puncture failure and low tensile strength in the longitudinal tape or machine direction.

In the case of the present invention, films with high puncture or tear resistance are unsuitable for use as severable adhesive tape backings in that this toughness is counter to the desired severability characteristics for a tape backing film. In addition, adhesive tape backings must be dimensionally stable and heat and shrink resistant in order to be processable during coating and drying operations, and to produce stable, uniform rolls of adhesive tape that do not exhibit telescoping or gapping which are known to be caused by longitudinal shrinkage or thermal instability. Moreover, the combination of low puncture resistance and dimensional stability are particularly desirable properties for an adhesive tape backing.

Prior art teachings (see for example U.S. Pat. No. 4,451, 533) direct that high stiffness and low tensile elongation to break are requirements to produce an easily severed adhesive tape or backing. Typically, films with high tensile elongation to break do not sever or dispense easily on a serrated dispenser. It has been surprisingly found that biaxially oriented adhesive tape backing film comprising isotactic polypropylene combined with at least one other polyolefin and having low stiffness and, in some cases, high tensile elongation to break can be produced having the desirable properties described herein. The incorporation by blending or mixing in the melt of a second polyolefin normally results in the formation of at least two polymer phases, one being the main component and the other being the minor component dispersed therein. In addition, each polyolefin polymer component may generally form crystalline and amorphous phases. The boundaries between the phases form internally weak points which can facilitate mechanical failure, in turn leading to severability and hand tearability. The volume, structure and composition of the phase boundaries can be controlled by polymer choice and amount, as well as processing temperatures, stretching, and rates.

The adhesive 18 coated on the first major surface 14 of tape backing 12 may be any suitable adhesive as is known in the art. Preferred adhesives are those activatable by pressure, heat or combinations thereof. Suitable adhesives include those based on acrylate, rubber resin, epoxies, urethanes or combinations thereof. The adhesive 18 may be applied by solution, water-based or hot-melt coating methods. The adhesive can include hot melt-coated formulations, transfer-coated formulations, solvent-coated formulations, and latex formulations, as well as laminating, thermally-activated, and water-activated adhesives. Useful adhesives according to the present invention include all pressure sensitive adhesives. Pressure sensitive adhesives are well known to possess properties including: aggressive and permanent tack, adherence with no more than finger pressure, and sufficient ability to hold onto an adherend. Examples of adhesives useful in the invention include those based on general compositions of polyacrylate; polyvinyl ether; diene rubber such as natural rubber, polyisoprene, and polybutadiene; polyisobutylene; polychloroprene; butyl rubber; butadiene-acrylonitrile polymer; thermoplastic elastomer; block copolymers such as styrene-isoprene and styrene-isoprene-styrene (SIS) block copolymers, ethylene-propylene-diene polymers, and styrene-butadiene polymers; poly-alpha-olefin; amorphous polyolefin; silicone; ethylene-containing copolymer such as ethylene vinyl acetate, ethylacrylate, and ethyl methacrylate; polyurethane; polyamide; epoxy; polyvinylpyrrolidone and vinylpyrrolidone copolymers; polyesters; and mixtures or blends (continuous or discontinuous phases) of the above. Additionally, the adhesives can contain additives such as tackifiers, plasticizers, fillers, antioxidants, stabilizers, pigments, diffusing materials, curatives, fibers, filaments, and solvents. Also, the adhesive optionally can be cured by any known method.

A general description of useful pressure sensitive adhesives may be found in Encyclopedia of Polymer Science and Engineering, Vol. 13, Wiley-Interscience Publishers (New York, 1988). Additional description of useful pressure sensitive adhesives may be found in Encyclopedia of Polymer Science and Technology, Vol. 1, Interscience Publishers (New York, 1964).

Figure 2:
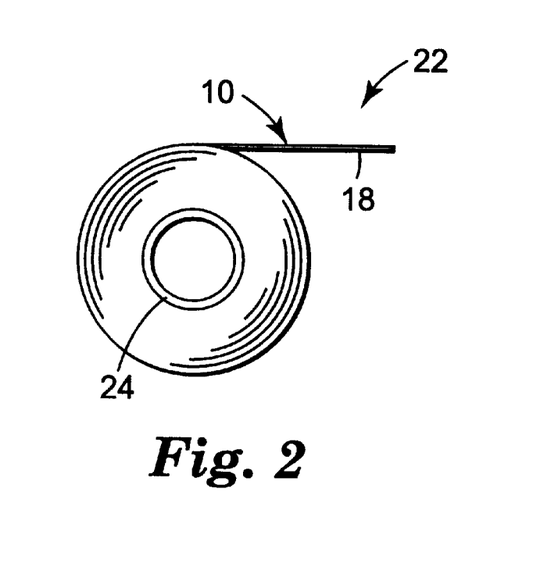
FIG. 2 is a side view of a roll of adhesive tape according to the present invention.

The film backing 12 of the tape 10 may optionally be treated by exposure to flame or corona discharge or other surface treatments including chemical priming to improve adhesion of subsequent coating layers. In addition, the second surface 16 of the film backing 12 may be coated with optional low adhesion backsize materials 20 to restrict adhesion between the opposite surface adhesive layer 18 and the film 12, thereby allowing for production of adhesive tape rolls capable of easy unwinding, as is well known in the adhesive coated tape-making art. The tape 10 may be spirally wound to make a roll 22, optionally on core 24, as illustrated in FIG. 2.

The backings described herein are well-suited for many adhesive tape backing applications, including utility tapes, light duty tapes, and sealing and mending tapes. Because the backing is conformable, it is also useful as a masking tape backing.

The operation of the present invention will be further described with regard to the following detailed examples. These examples are offered to further illustrate the various specific and preferred embodiments and techniques. It should be understood, however, that many variations and modifications may be made while remaining within the scope of the present invention.

Test Methods

Film Tensile Property Determinations

The machine direction (MD) tensile strength-at-break was measured according to the procedures described in ASTM D-882, "Tensile Properties of Thin Plastic Sheeting," Method A. The films were conditioned for 24 hours at 22° C. (72° F.) and 50 percent relative humidity (RH) prior to testing. The tests were performed using a tensile testing machine commercially available as a Model No. Sintech 200/S from MTS Systems Corporation, Eden Prairie, Minn. Specimens for this test were 2.54 cm wide and 15 cm long. An initial jaw separation of 10.2 cm and a crosshead speed of 25.4 cm/min were used. Six specimens were tested for each sample in the MD.

Puncture-energy Determination

The puncture energy and elongation to puncture were determined using a method based on ASTM F 1306-94 with the changes as detailed below: A Model No. Sintech 200/S tensile testing machine manufactured by MTS Systems Corporation, Eden Prairie, Minn. was used for the testing. The specimen clamping fixture described in ASTM F 1306-94 was modified to comprise two rigid plates having a 7.62-cm diameter square opening in the center of each plate. The penetration probe described in ASTM F 1306-94 was replaced with a 0.318 cm diameter cylindrical steel rod having a hemispherical tip. Displacement of the plunger assembly was measured during loading and complete penetration of each test specimen. Specimens for testing were cut parallel to the MD into 2.54 cm wide strips or in 1.27 cm wide strips, as reported below. Specimens were 12.7 cm in length to be adequately gripped in the clamp assembly. Each test was performed at a speed of 254 cm/min. At least six specimens were tested for each determination. The films were conditioned for 24 hours at 22° C. (72° F.) and 50 percent relative humidity (RH) prior to testing.

For each test, the specimen was clamped into the assembly. Each specimen was centered across the plate opening. A piece of pressure-sensitive adhesive tape was used to hold the sample onto one side of the bottom plate of the clamp assembly while a weight (75 g) was hung on the other side of the specimen so as to ensure that the sample was loaded under constant tension. The clamping plate was then tightened using thumb screws so that the sample did not slip during the test. The clamp assembly was positioned under the plunger so that the path of the plunger was through the center of the sample. The total energy required to puncture the sample as well as elongation to puncture was determined.

Figure 3:
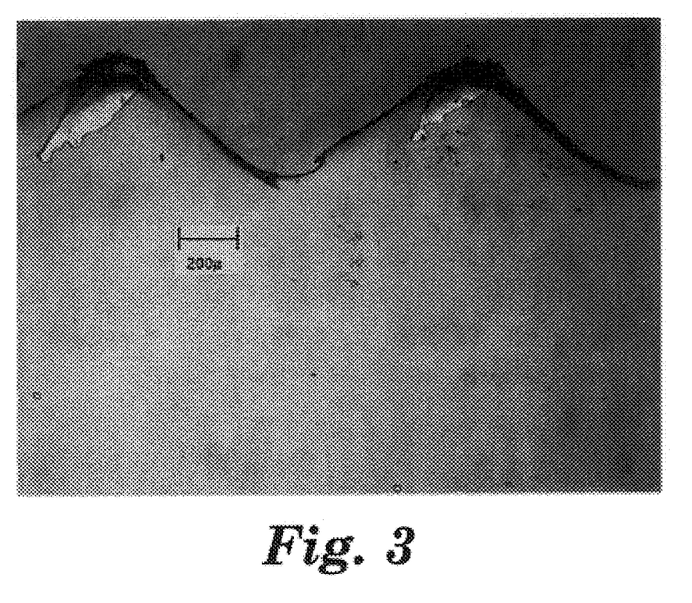
FIG. 3 is a digitally recorded micrograph of a an adhesive tape backing according to the present invention (Example 11) severed as described herein.
Figure 4:
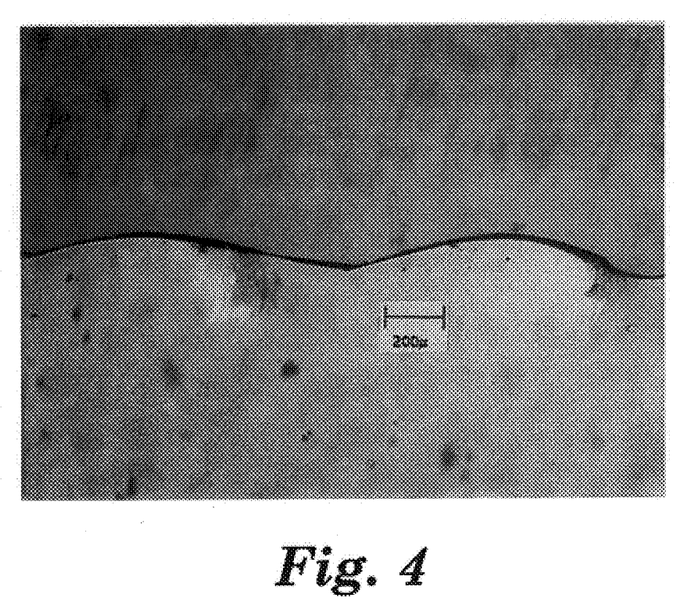
FIG. 4 is a digitally recorded micrograph of a comparative adhesive tape backing (Example C-1) severed as described herein.

As used herein, including the claims, the term "Puncture Test—2.54 cm" refers to the just-described test as performed on 2.54 cm wide samples, and the term "Puncture Test—1.27 cm" refers to the just-described test as performed on 1.27 cm wide samples Optical Microscopy of Severed Tape Backing Edges Tape backings produced according to this invention and comparative films described herein were dispensed on a serrated plastic blade (3M Catalog #105 available as of the filing date hereof from Minnesota Mining and Manufacturing Company, St. Paul, Minn.) by hand by pulling the tape backing straight down across the dispenser blade. As used herein, including the claims, the phrase "when severed on a serrated plastic cutting blade" and like phrases, refer to the just described dispenser and method. The films were first conditioned for 24 hours at 22° C. (72° F.) and 50 percent relative humidity (RH) prior to testing. Films dispensed against this blade were photographed using an Olympus BHSM Type BH-2 optical microscope available commercially from Leeds Precision Instruments, Inc., Minneapolis, Minn. The specimens were examined at 50×magnification using reflected light and photographed using Polaroid Type 57 black & white instant print film having an ASA of 3000. It was observed that inventive example 11, FIG. 3, had a serrated edge that closely followed the contour of the plastic cutting blade. Conversely, comparative example C-1, FIG. 4, has a distorted edge that does not closely follow the contour of the plastic blade.

PREPARATION OF EXAMPLES

A) Linear Motor Simultaneous Stretching Process

Simultaneously biaxially oriented polyolefin blend examples 1–15 and comparative examples C-1 and C-2 were prepared using the linear motor based simultaneous stretching process described in U.S. Pat. Nos. 4,675,582; 4,825,111; 4,853,602; 5,036,262; 5,051,225; and 5,072,493. The stretching equipment was built by Brückner Maschinenbrau, Seigsdorf, Germany. Polymers I and II and, in some examples, III, in composition (by weight) ratios listed in Table 2 were used. For examples 1–10 and 14–15, the isotactic polypropylene was a blend of Polymers I and III, while the second component was Polymer II. In examples 11–12, the isotactic polypropylene was Polymer I, and the second component was Polymer II. For comparative Examples C1–C2, The isotactic polypropylene was a blend of Polymers I and III, with no second polyolefin present. In Example 1, the polymer melt consisted of about 80% propylene homopolymer, (58% by weight of Polymer A and about 28% by weight of Polymer B) and about 20% Polymer G. Specifically, a Berstorff 6.0 cm twin screw extruder was used to produce a stable melt having a melt temperature of from about 202 to 235° C. The polymer melt mixture was extruded through a slot die and cast onto a water-cooled steel casting wheel rotating at about 4.7 to 6.8 meters per minute and which was thermostatted to about 20 to 30° C. using internal water circulation and by immersing the casting wheel in a water bath. The cast sheet had a width of about 35 cm and a thickness of about 0.15–0.20 cm.

The cast sheet was passed through a bank of IR heaters set to about 600° C. to preheat the cast film to approximately 100 to 110° C., as measured by IR surface pyrometry, prior to simultaneous stretching in the tenter oven. The cast and preheated film was immediately simultaneously stretched in longitudinal (MD) and transverse (TD) directions to produce biaxially oriented film. The tenter oven temperature setpoints used in the preheat, stretching, and annealing sections of the tenter for each example are listed in Table 3. Final total area stretching ratios of about 45:1 to about 75:1 were used. MD and TD ratios for each example are listed in Table 3. The films were about 0.030 mm thick and the slit widths were about 127 cm. Wind-up speed was about 45 meters/minute. The film was slit (offline) in the machine direction into useful sample widths for testing using a razor blade cutter equipped with fresh blades. Film properties are shown in Table 4.

B) Mechanical Simultaneous Stretching Process

Simultaneously biaxially oriented polyolefin blend examples 16–19 and comparative example C-3 were prepared with the mechanical simultaneous stretching process apparatus described in U.S. Pat. Nos. 4,330,499 and 4,595,738. Polymers (from Table 1) were used. Polymers I (isotactic polypropylene) and II (second polyolefin, where present) in composition ratios listed in Table 2 were extruded to produce a stable homogeneous melt having a melt temperature of about 246 to 255° C. The melt was cast through a slot die onto a water cooled steel casting wheel rotating at about 5 meters per minute which had about 10° C. water circulating through it. The cast sheet was next passed through a quenching water bath maintained at about 12 to 16° C. to produce a cast sheet having a width of about 55 cm and a thickness of about 0.15–0.2 cm.

The cast sheet was passed through a set of heated rolls at temperatures starting at 125° C. and finishing at 145 to 155° C. to preheat the cast film prior to simultaneous stretching.

The sheet was next gripped edgewise in a series of clips travelling on a set of diverging spindles having a 7:1 MD stretch screw pitch, and simultaneously stretched in the longitudinal (MD) and transverse (TD) directions to a final balanced tenter stretch ratio of about 64:1. The windup speed was about 40 meters per minute and a stretching temperature of about 175–177° C. Tenter stretching conditions are listed in Table 3. The films were about 0.034 to 0.040 mm thick and the slit widths were about 300 cm. The film was slit (offline) into useful sample widths for testing using a razor blade cutter equipped with fresh blades. Film properties are shown in Table 4.

C) Sequential Tenter Process

Examples 20 to 30 and comparative examples C-4 to C-10 were prepared as follows. Polymers from Table 1 were used. Polymers I (isotactic polypropylene) and II (second polyolefin, where present) in ratios listed in Table 2 were simultaneously fed to a 4.45 cm single screw extruder manufactured by H. P. M., Mt. Gilead, Ohio. Polymer I was gravity fed and Polymer II was added with a calibrated Acrison feeder. The polymer mix was heated to 252° C. using extruder barrel zone heating set points of 230 to 252° C. The melt was transferred at 230° C. to and through a 17.8 cm single manifold sheet die. The extrudate was cast onto a rotating smooth steel casting wheel maintained at about 33° C. with a circulating water bath, in which a portion of the wheel was immersed. The casting wheel temperature was also maintained by circulated ambient (30° C.) temperature water. The casting temperature was about 33° C. for each example.

The cast film was passed over a set of five rollers internally heated to 125° C. and stretched in the longitudinal or machine direction (MD) to a stretch ratio of about 5:1.

The MD stretched sheet was next gripped edgewise in a series of clips on divergent tenter rails and stretched in the crosswise or transverse direction (TD) to a final TD stretch ratio of about 9:1. The specific stretching conditions and tenter temperature conditions for each example are listed in Table 3. The resulting biaxially stretched film was cooled to room temperature, its edges trimmed by razor slitting and wound onto a master roll at about 10 meters per minute. The films were about 0.028 to 0.038 mm thick and the slit widths were about 25 cm. The film was slit (offline) in the machine direction into useful sample widths for testing using a razor blade cutter equipped with fresh blades. The film properties are shown in Table 4.

Comparative examples C-11 and C-12

The tape backing used in SCOTCH brand Tear by Hand Tape (available from Minnesota Mining and Manufacturing Company, St. Paul, Minn.) was slit in the machine direction into useful sample widths for testing using a razor blade cutter equipped with fresh blades. The film properties are shown in Table 4. This film is a two layer polyolefin film. The first layer is stretched to about 5:1 in the MD. The second layer is then extruded on the first, and the two layer film is then stretched to about 10:1 in the TD. In the puncture tests, the puncture test was performed first with one layer facing up (C-11), and then repeated with the other layer facing up (C-12).

TABLE 1

POLYMER IDENTIFICATION

| Polymer | General description | Supplier | Designation | MFR | MFI[1] | Density[2] (g/cm³) |
|---|---|---|---|---|---|---|
| A | PP homopolymer | Fina | PP 3374 | 2.5 | | |
| B | PP homopolymer | Fina | PP 3571 | 9 | | |
| C | PP homopolymer | Montell | S38F PP | 2 | | |
| D | Syndiotactic PP | Fina | EOD 96-34 | 10 | | |
| E | Syndiotactic PP | Fina | EOD 96-28 | 2 | | |
| F | Polybutylene | Montell | PB 0200 | 2 | | |
| G | LLDPE | Dow | DOWLEX 2027A | | 4 | 0.94 |
| H | LLDPE | Eastman | TENITE 757 | | 2 | 0.91 |
| I | EVA | Dupont | ELVAX 360 | | 2 | 0.95 |
| J | EVA | Dupont | ELVAX 760 | | 2 | 0.93 |
| K | PP copolymer | Fina | Z 9470 | 5 | | |

[1]Reported in g/10 min as determined by ASTM D1238-95: MFR at 230° C., 2.16 kg condition for polymers A, B, C, D, E, F, K. MFI at 190° C., 2.16 kg condition for polymers G, H, I, J. Values provided by manufacturers.
[2]Density as reported by manufacturer.

TABLE 2

BLEND COMPOSITIONS

| EX. | Polymer I | % I | Polymer II | % II | Polymer III | % III |
|---|---|---|---|---|---|---|
| 1 | A | 52 | G | 20 | B | 28 |
| 2 | A | 52 | G | 20 | B | 28 |
| 3 | A | 52 | G | 20 | B | 28 |
| 4 | A | 52 | G | 20 | B | 28 |
| 5 | A | 52 | G | 20 | B | 28 |
| 6 | A | 52 | G | 20 | B | 28 |
| 7 | A | 52 | G | 20 | B | 28 |
| 8 | A | 52 | G | 20 | B | 28 |
| 9 | A | 52 | G | 20 | B | 28 |
| 10 | A | 52 | G | 20 | B | 28 |
| 11 | A | 80 | F | 20 | — | — |
| 12 | A | 80 | F | 20 | — | — |
| 13 | A | 80 | F | 20 | — | — |
| 14 | A | 52 | D | 20 | B | 28 |
| 15 | A | 52 | D | 20 | B | 28 |
| C-1 | A | 65 | — | — | B | 35 |
| C-2 | A | 65 | — | — | B | 35 |
| 16 | C | 50 | F | 50 | — | — |
| 17 | C | 70 | F | 30 | — | — |
| 18 | C | 85 | F | 15 | — | — |
| 19 | C | 60 | E | 40 | — | — |
| C-3 | C | 100 | — | — | — | — |
| 20 | B | 90 | G | 10 | — | — |
| 21 | B | 80 | G | 20 | — | — |
| 22 | B | 90 | G | 10 | — | — |
| 23 | A | 80 | G | 20 | — | — |
| 24 | B | 80 | G | 20 | — | — |
| 25 | A | 80 | H | 20 | — | — |
| 26 | A | 80 | H | 20 | — | — |
| 27 | A | 70 | D | 30 | — | — |
| 28 | A | 80 | D | 20 | — | — |
| 29 | A | 80 | J | 20 | — | — |
| 30 | A | 80 | K | 20 | — | — |
| C-4 | A | 100 | — | — | — | — |
| C-5 | A | 100 | — | — | — | — |
| C-6 | B | 90 | G | 10 | — | — |
| C-7 | A | 80 | H | 20 | — | — |
| C-8 | A | 80 | I | 20 | — | — |
| C-9 | A | 80 | G | 20 | — | — |
| C-10 | A | 80 | K | 20 | — | — |

TABLE 3

STRETCHING CONDITIONS

| EX. | Process | Pre-heat (° C.) | Stretch (° C.) | Anneal (° C.) | MDR | TDR | Area Stretch Ratio |
|---|---|---|---|---|---|---|---|
| 1 | A | 207 | 175 | 130 | 7.5 | 8.3 | 62 |
| 2 | A | 207 | 175 | 160 | 7.5 | 8.6 | 65 |
| 3 | A | 192 | 180 | 160 | 7.5 | 7.7 | 58 |
| 4 | A | 205 | 170 | 130 | 7.5 | 7.9 | 59 |
| 5 | A | 192 | 180 | 130 | 7.5 | 10.0 | 75 |
| 6 | A | 192 | 180 | 130 | 7.5 | 7.5 | 56 |
| 7 | A | 197 | 175 | 130 | 7.5 | 7.4 | 56 |
| 8 | A | 192 | 180 | 160 | 8 | 8.1 | 65 |
| 9 | A | 207 | 170 | 160 | 7.5 | 7.9 | 59 |
| 10 | A | 202 | 170 | 130 | 7.5 | 7.6 | 57 |
| 11 | A | 192 | 175 | 165 | 7.5 | 7.0 | 53 |
| 12 | A | 195 | 170 | 165 | 7.5 | 7.2 | 54 |
| 13 | A | 192 | 170 | 165 | 7.5 | 6.7 | 50 |
| 14 | A | 192 | 178 | 160 | 7.5 | 7.5 | 56 |
| 15 | A | 192 | 170 | 145 | 7.5 | 6.8 | 51 |
| C-1 | A | 192 | 170 | 130 | 6.5 | 7.1 | 46 |
| C-2 | A | 197 | 175 | 130 | 7 | 7.3 | 51 |
| 16 | B | 175 | 173 | 35 | 8 | 8 | 64 |
| 17 | B | 177 | 173 | 35 | 8 | 8 | 64 |
| 18 | B | 177 | 173 | 35 | 8 | 8 | 64 |
| 19 | B | 170 | 170 | 35 | 8 | 8 | 64 |
| C-3 | B | 177 | 175 | 35 | 8 | 8 | 64 |
| 20 | C | 172 | 172 | 145 | 5 | 9 | 45 |
| 21 | C | 170 | 170 | 145 | 5 | 9 | 45 |
| 22 | C | 172 | 172 | 145 | 5 | 9 | 45 |
| 23 | C | 172 | 172 | 145 | 5 | 9 | 45 |

TABLE 3-continued

STRETCHING CONDITIONS

| EX. | Process | Pre-heat (° C.) | Stretch (° C.) | Anneal (° C.) | MDR | TDR | Area Stretch Ratio |
|---|---|---|---|---|---|---|---|
| 24 | C | 172 | 172 | 145 | 5 | 9 | 45 |
| 25 | C | 175 | 175 | 145 | 5 | 10 | 50 |
| 26 | C | 172 | 172 | 145 | 5 | 9 | 45 |
| 27 | C | 172 | 172 | 145 | 5 | 10.5 | 53 |
| 28 | C | 172 | 172 | 145 | 5 | 10.5 | 53 |
| 29 | C | 172 | 172 | 145 | 5 | 9 | 45 |
| 30 | C | 172 | 172 | 145 | 5 | 9 | 45 |
| C-4 | C | 166 | 166 | 145 | 5 | 9 | 45 |
| C-5 | C | 172 | 172 | 145 | 5 | 9 | 45 |
| C-6 | C | 166 | 166 | 145 | 5 | 9 | 45 |
| C-7 | C | 162 | 162 | 145 | 5 | 9 | 45 |
| C-8 | C | 172 | 172 | 145 | 5 | 9 | 45 |
| C-9 | C | 166 | 166 | 145 | 5 | 9 | 45 |
| C-10 | C | 166 | 166 | 145 | 5 | 9 | 45 |

TABLE 4

MACHINE DIRECTION FILM PROPERTIES

| EX. | Thickness (mm) | Tensile Strength (MPa) | Puncture Energy - 2.54 cm (J/cm$^2$) | Puncture Elongation - 2.54 cm (cm) | Puncture Energy - 1.27 cm (J/cm$^2$) | Puncture Elongation - 1.27 cm (cm) |
|---|---|---|---|---|---|---|
| 1 | 0.030 | 48 | 1.6 | 0.8 | 22 | 1.3 |
| 2 | 0.029 | 36 | 3.7 | 0.7 | 18 | 1.3 |
| 3 | 0.030 | 44 | 4.5 | 0.8 | 30 | 1.5 |
| 4 | 0.030 | 71 | 3.4 | 0.9 | 49 | 1.8 |
| 5 | 0.032 | 70 | 7.5 | 0.9 | 41 | 1.7 |
| 6 | 0.030 | 69 | 5.3 | 0.8 | 37 | 1.6 |
| 7 | 0.031 | 87 | 9.5 | 1.0 | 48 | 1.8 |
| 8 | 0.029 | 69 | 9.8 | 0.9 | 37 | 1.6 |
| 9 | 0.030 | 82 | 10 | 1.0 | 45 | 1.7 |
| 10 | 0.030 | 87 | 13 | 1.0 | 52 | 1.7 |
| 11 | 0.030 | 52 | 6.8 | 1.0 | 29 | 1.5 |
| 12 | 0.030 | 75 | 11 | 1.1 | — | — |
| 13 | 0.030 | 109 | 19 | 1.2 | 30 | 1.8 |
| 14 | 0.029 | 76 | 11 | 1.1 | — | — |
| 15 | 0.031 | 104 | 16 | 1.1 | 30 | 1.8 |
| C-1 | 0.030 | 166 | 31 | 1.4 | 122 | 2.2 |
| C-2 | 0.033 | 109 | 23 | 1.4 | 97 | 2.2 |
| 16 | 0.038 | 68 | 6.4 | 0.9 | 34 | 1.6 |
| 17 | 0.035 | 95 | 16 | 1.1 | 56 | 1.9 |
| 18 | 0.037 | 125 | 19 | 1.2 | 78 | 2.0 |
| 19 | 0.039 | 94 | 17 | 1.3 | 66 | 2.0 |
| C-3 | 0.036 | 169 | 33 | 1.5 | 121 | 2.4 |
| 20 | 0.033 | 38 | 0.7 | 0.3 | 2 | 0.6 |
| 21 | 0.032 | 38 | 1.6 | 0.5 | 3 | 0.6 |
| 22 | 0.032 | 40 | 2.2 | 0.7 | 7 | 0.8 |
| 23 | 0.034 | 36 | 1.9 | 0.6 | 4 | 0.7 |
| 24 | 0.032 | 51 | 4.7 | 0.9 | 22 | 1.3 |
| 25 | 0.031 | 31 | 2.4 | 0.7 | 5 | 0.8 |
| 26 | 0.028 | 39 | 4.2 | 1.0 | 16 | 1.3 |
| 27 | 0.038 | 58 | 3.4 | 0.8 | 16 | 1.1 |
| 28 | 0.031 | 45 | 6.2 | 1.1 | 16 | 1.2 |
| 29 | 0.032 | 37 | 5.6 | 1.1 | 30 | 1.8 |
| 30 | 0.033 | 34 | 2.6 | 0.8 | 37 | 0.6 |
| C-4 | 0.033 | 137 | 59 | 2.5 | 346 | 4.6 |
| C-5 | 0.034 | 113 | 48 | 2.4 | 340 | 5.2 |
| C-6 | 0.033 | 80 | 15 | 1.5 | 102 | 2.8 |
| C-7 | 0.030 | 140 | 42 | 2.2 | 148 | 2.7 |
| C-8 | 0.034 | 112 | 28 | 1.9 | 140 | 2.9 |
| C-9 | 0.032 | 77 | 15 | 1.6 | 106 | 3.2 |
| C-10 | 0.031 | 132 | 55 | 2.5 | 268 | 4.2 |
| C-11 | 0.040 | 55 | 79 | 2.7 | 458 | 7.1 |
| C-12 | 0.040 | 55 | 41 | 2.0 | 336 | 5.8 |

The tests and test results described above are intended solely to be illustrative, rather than predictive, and variations in the testing procedure can be expected to yield different results.

The present invention has now been described with reference to several embodiments thereof. The foregoing detailed description and examples have been given for clarity of understanding only. No unnecessary limitations are to be understood therefrom. All patents and patent applications cited herein are hereby incorporated by reference. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. An adhesive tape backing comprising a monolayer film comprised of 40 to 90% isotactic polypropylene, having a first melting point and 10% to 60% of a second component, wherein said second component comprises a polyolefin having a melting point lower than the first melting point, but above 100° C., and further wherein the monolayer film has been biaxially stretched to a stretch area ratio of at least 36:1, such that when the monolayer film is tested according to the Puncture Test—2.54 cm, said backing has a puncture energy of up to 20 J/cm$^2$ and a puncture elongation of up to 1.3 cm.

2. The tape backing of claim 1, wherein said second component comprises polyethylene, polybutylene, or syndiotactic polypropylene.

3. The tape backing of claim 1, wherein the monolayer film comprises 20% to 40% of said second component.

4. The tape backing of claim 1, wherein said second melting point is between about 120° C. and 155° C.

5. The tape backing of claim 1, wherein the monolayer film has a tensile strength of up to 140 MPa in the MD.

6. The tape backing of claim 4, wherein the monolayer film has an MDR of at least 4:1.

7. The tape backing of claim 1 wherein when the monolayer film is severed on a serrated plastic cutting blade and the monolayer film exhibits a serrated edge that closely follows the contour of the cutting blade.

8. The tape backing of claim 1, wherein when the monolayer film is tested according to the Puncture Test—2.54 cm, the monolayer film has a puncture energy of up to 8 J/cm$^2$, and wherein the monolayer film has a tensile strength of up to 100 MPa in the MD.

9. The tape backing of claim 1, wherein when the monolayer film is tested according to the Puncture Test—2.54 cm, the monolayer film has a puncture energy of up to 5 J/cm$^2$, and wherein the monolayer film has a tensile strength of up to 50 MPa in the MD.

10. The tape backing of claim 1, wherein the monolayer film has been simultaneously biaxially stretched.

11. The tape backing of claim 1, further comprising a layer of adhesive on a first major surface thereof.

* * * * *

UNITED STATES PATENT AND TRADEMARK OFFICE
CERTIFICATE OF CORRECTION

PATENT NO.   : 6,451,425 B1
DATED        : September 17, 2002
INVENTOR(S)  : Kozulla, Randall E.

It is certified that error appears in the above-identified patent and that said Letters Patent is hereby corrected as shown below:

Column 6,
Line 52, delete "8:5:1" and insert -- 8.5:1 --, therefore.

Column 13,
Line 33, delete "MFR" and insert -- MFR' --, therefore.

Signed and Sealed this

Sixteenth Day of November, 2004

JON W. DUDAS
*Director of the United States Patent and Trademark Office*